(12) United States Patent
Li et al.

(10) Patent No.: US 10,325,220 B2
(45) Date of Patent: Jun. 18, 2019

(54) SYSTEM AND METHOD FOR LARGE-SCALE MULTI-LABEL LEARNING USING INCOMPLETE LABEL ASSIGNMENTS

(71) Applicant: OATH INC., New York, NY (US)

(72) Inventors: Jia Li, Santa Clara, CA (US); Yi Chang, Sunnyvale, CA (US); Xiangnan Kong, Worcester, MA (US)

(73) Assignee: OATH INC., New York, NY (US)

( * ) Notice: Subject to any disclaimer, the term of this patent is extended or adjusted under 35 U.S.C. 154(b) by 900 days.

(21) Appl. No.: 14/543,133

(22) Filed: Nov. 17, 2014

(65) Prior Publication Data

US 2016/0140451 A1 May 19, 2016

(51) Int. Cl.
| | |
|---|---|
| *G06N 7/02* | (2006.01) |
| *G06N 7/04* | (2006.01) |
| *G06N 7/06* | (2006.01) |
| *G06N 7/08* | (2006.01) |
| *G06N 20/00* | (2019.01) |

(52) U.S. Cl.
CPC .................... *G06N 20/00* (2019.01)

(58) Field of Classification Search
None
See application file for complete search history.

(56) References Cited

U.S. PATENT DOCUMENTS

| | | | |
|---|---|---|---|
| 6,453,307 B1* | 9/2002 | Schapire | G06K 9/6256 706/12 |
| 2009/0125462 A1* | 5/2009 | Krishnaswamy | G06Q 30/02 706/12 |
| 2009/0157572 A1* | 6/2009 | Chidlovskii | G06N 99/005 706/12 |
| 2011/0184806 A1* | 7/2011 | Chen | G06K 9/6226 705/14.52 |
| 2011/0302111 A1* | 12/2011 | Chidlovskii | G06N 99/005 706/12 |
| 2013/0218813 A1* | 8/2013 | Rinott | G06Q 10/10 706/12 |

OTHER PUBLICATIONS

Multi-label Learning with Incomplete Class Assignments—2011 Bucak et al.*
Improving stacking approach for multi-label-classification—2011 Montañés et al.*
Multilabel Classification with Label Correlations and Missing Labels—2014 Bi et al.*
An Ensemble-based Approach to Fast Classification of Multi-label Data Streams—2011 Kong et al.*

(Continued)

*Primary Examiner* — Scott A. Waldron
*Assistant Examiner* — Ababacar Seck
(74) *Attorney, Agent, or Firm* — James J. DeCarlo; Greenberg Traurig, LLP

(57) ABSTRACT

At least one label prediction model is trained, or learned, using training data that may comprise training instances that may be missing one or more labels. The at least one label prediction model may be used in identifying a content item's ground-truth label set comprising an indicator for each label in the label set indicating whether or not the label is applicable to the content item.

27 Claims, 11 Drawing Sheets

(56) References Cited

OTHER PUBLICATIONS

Multi-label Learning with Incomplete Class Assignments—2011 Bucak et al. (Year: 2011).*
Improving stacking approach for multi-label-classification—2011 Montañés et al. (Year: 2011).*
Multilabel Classification with Label Correlations and Missing Labels—2014 Bi et al. (Year: 2011).*
An Ensemble-based Approach to Fast Classification of Multi-label Data Streams—2011 Kong et al. (Year: 2011).*
Large-scale Multi-label Learning with Missing Labels Hsiang-Fu Yu, Prateek Jain, Purushottam Kar, Inderjit S. Dhillon (Year: 2014).*
Why Stacked Models Perform Effective Collective Classification—2008 Fast et al. (Year: 2009).*
Large Scale Multi-Label Classification via Meta Labeler—2009 Lei Tang, Suju Rajan, Vijay K. Narayanan (Year: 2009).*
Stacked Graphical Learning Zhenzhen Kou Dec. 2007 (Year: 2007).*
M. R. Boutell, J. Luo, X. Shen, and C. M. Brown. Learning multi-label scene classification. Pattern Recognition, 37(9):1757{1771, 2004.
S. Bucak, R. Jin, and A. K. Jain. Multi-label learning with incomplete class assignments. In The 24th IEEE Conference on Computer Vision and Pattern Recognition, pp. 2801-2808, Colorado Springs, CO, 2011.
W. Cheng and E. ★ullermeier. Combining instance-based learning and logistic regression for multilabel classification. Machine Learning, 76(2-3):211-225, 2009.
K. Dembczyinski, W. Cheng, and E. Hullermeier. Bayes optimal multilabel classification via probabilistic classifier chains. In Proceedings of the 27th International Conference on Machine Learning, pp. 279-286, Haifa, Israel, 2010.
A. Elisseeff and J. Weston. A kernel method for multilabelled classification. In NIPS, pp. 681-687. MIT Press, Cambridge, MA, 2002.
C. Elkan and K. Noto. Learning classifiers from only positive and unlabeled data. In Proceedings of the 14th ACM SIGKDD International Conference on Knowledge Discovery and Data, pp. 213-220, Las Vegas, NV, 2008.
A. Fast and D. Jensen. Why stacked models perform effective collective classification. In Proceedings of the 8th IEEE International Conference on Data Mining, Pisa, Italy, 2008.
I. V. G. Tsoumakas. Random k-labelsets: An ensemble method for multilabel classification. In Proceedings of 18th European Conference on Machine Learning, pp. 406-417, Warsaw, Poland, 2007.
N. Ghamrawi and A. McCallum. Collective multi-label classification. In Proceedings of ACM CIKM International Conference on Information and Knowledge Management, pp. 195-200, Bremen, Germany, 2005.
S. Godbole and S. Sarawagi. Discriminative methods for multi-labeled classification. In Proceedings of the 8th Pacific-Asia Conference on Knowledge Discovery and Data Mining, 2004.
Y. Guo and D. Schuurmans. Adaptive large margin training for multilabel classification. In Proceedings of the 25th AAAI Conference on Artificial Intelligence, San Francisco, CA, 2011.
B. hariharan, L. Zelnik-Manor, S. V. N. Vishwanathan, and M. Varma. Large scale max-margin multi-label classification with priors. In Proceedings of the 27th International Conference on Machine Learning, pp. 423-430, Haifa, Israel, 2010.
F. Kang, R. Jin, and R. Sukthankar. Correlated label propagation with application to multi-label learning. In IEEE Computer Society Conference on ComputerVision and Pattern Recognition, pp. 1719-1726, New York, NY, 2006.
H. Kazawa, T. Izumitani, H. Taira, and E. Maeda. Maximal margin labeling for multi-topic text categorization. In NIPS. 2005.
Z. Kou and W. Cohen. Stacked graphical models for ecient inference in markov random fields. In Proceedings of the 7th SIAM International Conference on Data Mining, Minneapolis, MI, 2007.
B. Liu, Y. Dai, X. Li, W. S. Lee, and P. S. Yu. Building text classifiers using positive and unlabeled examples. In Proceedings of the 3rd IEEE International Conference on Data Mining, pp. 19-22, Melbourne, FL, 2003.
Y. Liu, R. Jin, and L. Yang. Semi-supervised multilabel learning by constrained non-negative matrix factorization. In The 21st National Conference on Artificial Intelligence, pp. 421-426, Boston, MA, 2006.
Z. Qi, M. Yang, Z. Zhang, and Z. Zhang. Mining partially annotated images. In Proceedings of the 17th ACM SIGKDD International Conference on Knowledge Discovery and Data Mining, San Diego, CA, 2011.
J. Read, B. Pfahringer, and G. Holmes. Multi-label classification using ensembles of pruned sets. In Proceedings of the 8th IEEE International Conference on Data Mining, pp. 995-1000, Pisa, Italy, 2008.
J. Read, B. Pfahringer, G. Holmes, and E. Frank. Classifier chains for multi-label classification. In the European Conference on Machine Learning and Principles and Practice of Knowledge Discovery in Databases, pp. 254-269, Bled, Slovenia, 2009.
Y. Sun, Y. Zhang, and Z. Zhou. Multi-label learning with weak label. In The 24th AAAI Conference on Artificial Intelligence, pp. 593-598, Atlanta, GA, 2010.
N. Ueda and K. Saito. Parametric mixture models for multi-labeled text. In NIPS, pp. 721-728. MIT Press, Cambridge, MA, 2003.
D. Wolpert. Stacked generalization. Neural Networks, 5:241-259, 1992.
M.-L. Zhang and K. Zhang. Multi-label learning by exploiting label dependency. In Proceedings of the 16th ACM SIGKDD International Conference on Knowledge Discovery and Data Mining, pp. 999-1008, Washington, DC, 2010.
M.-L. Zhang and Z.-H. Zhou. Ml-knn: A lazy learning approach to multi-label learning. Pattern Recognition, 40(7):2038-2048, 2007.
M.-L. Zhang and Z.-H. Zhou. Multi-label learning by instance differentiation. In Proceedings of the 21nd AAAI Conference on Artificial Intelligence, pp. 669-674, Vancouver, Canada, 2007.
Kong, et al. Large-Scale Multi-Label Learning with Incomplete Label Assignments; 9 pages.

* cited by examiner

| Symbol | Definition |
|---|---|
| $x_1, \cdots, x_n$ | the feature vectors for training instances |
| $y_1, \cdots, y_n$ | the set of variables for label sets of the training instances |
| $s_1, \cdots, s_n$ | the set of annotated labels for the training instances |
| $y_i = (y_i^1, \cdots, y_i^q)^T$ | the vector of variables for the label set of instance $x_i$, and $y_i^k \in \{0,1\}$ |
| $s_i = (s_i^1, \cdots, s_i^q)^T$ | the vector of annotated labels for instance $x_i$, and $s_i^k \in \{0,1\}$, $s_i^k \leq y_i^k$ |
| $\mathcal{D} = \{(x_i, s_i)\}_{i=1}^n$ | the training set for multi-label learning with incomplete label assignments |

Given a training set $D = \{(x_i, s_i)\}_{i=1}^n$ and a PU learning algorithm $A$. Construct a cross-validation prediction $\hat{y}_i$ for each instance $x_i$ as follows:

1. Convert $D$ into $\{D_1, \ldots, D_q\}$, $D_k = \{(x_i, s_i^k)\}_{i=1}^n$
2. $\forall k$, partition $D^k$ into $m$ disjoint subsets with equal-size, denoted as $D_1^k, \ldots, D_m^k$
3. $\forall j = 1, \ldots, m, k = 1, \ldots, q$,
    train one model $f_k^j = A(D_k - D_k^j)$;
    $\forall x_i \in D_k^j, \hat{y}_k^i = f_k^j(x_i)$;
4. $\forall i = 1, \ldots, n$, we have $\hat{y}_i = (\hat{y}_i^1, \ldots, \hat{y}_i^q)^\top$
   Return $\{\hat{y}_i\}_{i=1}^n$

Fig. 8

SYSTEM AND METHOD FOR LARGE-SCALE MULTI-LABEL LEARNING USING INCOMPLETE LABEL ASSIGNMENTS

FIELD OF THE DISCLOSURE

The present disclosure relates to automatically labeling, or tagging, of content, and more specifically to automatically labeling, or tagging, content using training data comprising partially-labeled training instances.

BACKGROUND

A content item may be annotated using one or more labels. For example, an image may have one or more associated labels that may identify objects depicted in the image, as well as other labels that may impart information about the image.

SUMMARY

In accordance with one or more embodiments of the present disclosure, at least one label prediction model is trained, or learned, using training data that may comprise training instances that may be missing one or more labels. The at least one label prediction model may be used in identifying a content item's ground-truth label set comprising an indicator for each label in the label set indicating whether or not the label is applicable to the content item.

In accordance with one or more embodiments, a method is provided, the method comprising training, using a computing device, an initial level of a stacked model for use in making a labeling prediction, the initial level being trained using feature information for each training instance of a plurality of training instances, at least one training instance of the plurality is missing at least one label of a plurality of labels, the feature information corresponding to a plurality of features associated with the training instance of the plurality; generating, using the computing device, a labeling prediction for each training instance of the plurality using the initial level of the stacked model, the labeling prediction comprising a label applicability prediction for at least one label of the plurality of labels missing from the training instance's set of labels; training, using the computing device, one or more additional levels of the stacked model, each additional level being trained using information for each training instance of the plurality, each training instance's information comprising the labeling prediction from a previous level of the stacked model, the feature information corresponding to the plurality to features, and information indicating the training instance's set of labels; and identifying, using the computing device, a labeling prediction for a content item using the stacked model, the labeling prediction identifying for each label of the plurality whether the label is applicable to the content item.

In accordance with one or more embodiments a system is provided, which system comprises a processor and storage medium for tangibly storing thereon program logic for execution by the processor, the stored logic comprising training logic executed by the processor for training an initial level of a stacked model for use in making a labeling prediction, the initial level being trained using feature information for each training instance of a plurality of training instances, at least one training instance of the plurality is missing at least one label of a plurality of labels, the feature information corresponding to a plurality of features associated with the training instance of the plurality; generating logic executed by the processor for generating a labeling prediction for each training instance of the plurality using the initial level of the stacked model, the labeling prediction comprising a label applicability prediction for at least one label of the plurality of labels missing from the training instance's set of labels; training logic executed by the processor for training one or more additional levels of the stacked model, each additional level being trained using information for each training instance of the plurality, each training instance's information comprising the labeling prediction from a previous level of the stacked model, the feature information corresponding to the plurality to features, and information indicating the training instance's set of labels; and identifying logic executed by the processor for identifying a labeling prediction for a content item using the stacked model, the labeling prediction identifying for each label of the plurality whether the label is applicable to the content item.

In accordance with yet another aspect of the disclosure, a computer readable non-transitory storage medium is provided, the medium for tangibly storing thereon computer readable instructions that when executed cause at least one processor to train an initial level of a stacked model for use in making a labeling prediction, the initial level being trained using feature information for each training instance of a plurality of training instances, at least one training instance of the plurality is missing at least one label of a plurality of labels, the feature information corresponding to a plurality of features associated with the training instance of the plurality; generate a labeling prediction for each training instance of the plurality using the initial level of the stacked model, the labeling prediction comprising a label applicability prediction for at least one label of the plurality of labels missing from the training instance's set of labels; train one or more additional levels of the stacked model, each additional level being trained using information for each training instance of the plurality, each training instance's information comprising the labeling prediction from a previous level of the stacked model, the feature information corresponding to the plurality to features, and information indicating the training instance's set of labels; and identify a labeling prediction for a content item using the stacked model, the labeling prediction identifying for each label of the plurality whether the label is applicable to the content item.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides an example of a process flow for use in accordance with one or more embodiments of the present disclosure.

FIG. 2 provides an example of an instance for use in accordance with one or more embodiments of the present disclosure.

FIG. 3 provides an example of a training instance for use in accordance with one or more embodiments of the present disclosure.

FIG. 4 provides a stacked model generation example in accordance with one or more embodiments of the present disclosure.

FIG. 5 illustrates a stacked model inference example using test instance(s) in accordance with one or more embodiments of the present disclosure.

FIG. 6 provides some notational examples used herein in connection with one or more embodiments of the present disclosure.

FIG. 7 provides an example of model generation pseudo-code in accordance with one or more embodiments of the present disclosure.

FIG. 8 provides a cross-validation pseudocode example for use in accordance with one or more embodiments of the present disclosure.

FIG. 9 provides an illustrative overview corresponding to the cross-validation example shown in FIG. 8.

DETAILED DESCRIPTION

Figure 1:
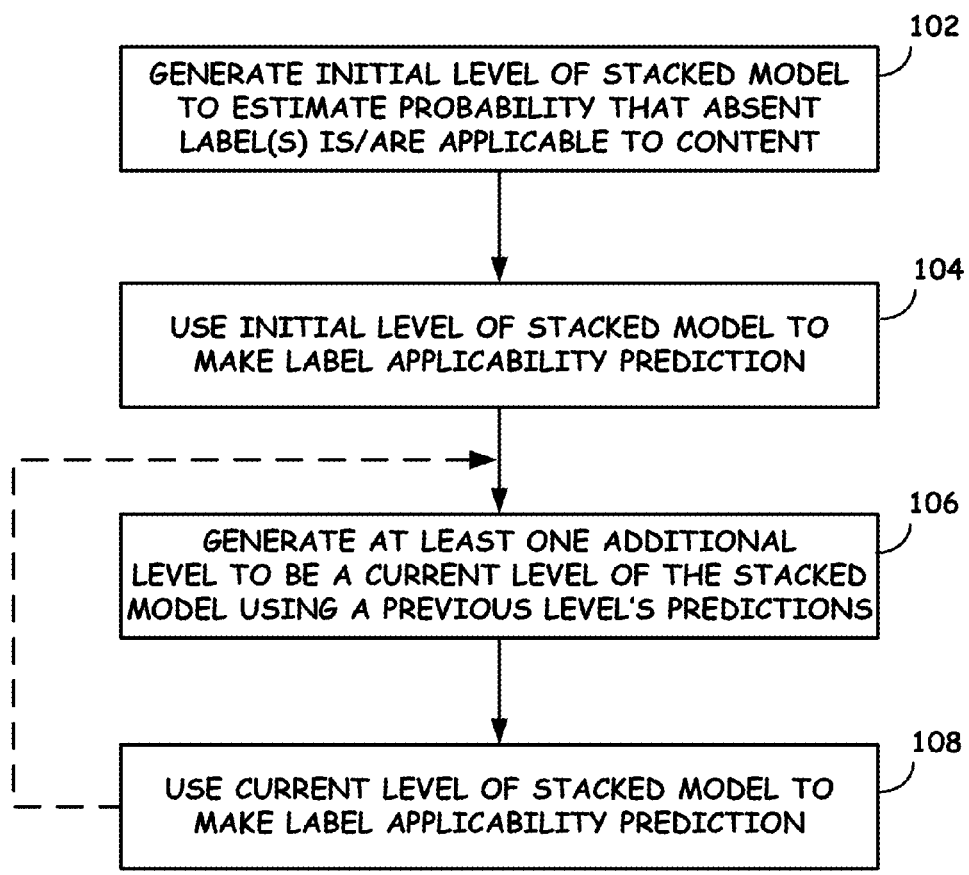

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

In general, the present disclosure provides a system, method and architecture for use in multi-label learning that may be used with incomplete label assignments. In accordance with one or more embodiments, a training data set comprising a plurality of training instances, each of which corresponds to a content item, and one or more of which may be partially labeled may be used to train models in a stacked, or chained, modeling design. In accordance with one or more embodiments, label correlations may be used to facilitate learning. Embodiments of the present disclosure provide an ability for scaling to accommodate large and/or small amounts of data, where the scaling may be linear in both the number instances and number of classes. Empirical evidence derived from real-world datasets demonstrates that the approach taken in accordance with one or more embodiments significantly boosts performance of multi-label classification by considering missing labels and incorporating label correlations.

In accordance with one or more embodiments, ground-truth label sets may be estimated for training data using the incomplete label sets provided by the training data, and the estimated ground-truth label sets may be used to facilitate training of multi-label learning. In accordance with one or more such embodiments, correlations among multiple labels may be exploited to improve multi-label classification performance.

In accordance with one or more embodiments, missing label assignments in a training data set may be addressed using a positive and unlabeled (PU) stochastic gradient descent. In accordance with one or more such embodiments, a framework may be built for incorporating correlations among labels based upon stack models. A multi-label learning method referred to herein as Mpu may consider label correlations using a stacked model, which need not rely on joint inference for all labels. Stacking is an example of ensemble methods, which build a chain of methods. Each model in the stacking uses output of a previous model, or models, as input. A stacked multi-label model allows inferences upon one label to influence inferences about other labels, and uses a base model to predict class labels for each label and uses those inferred labels as input to another level of the stacked model. Performance of multi-label classification with partially labeled training data is significantly boosted using embodiments of the present disclosure that consider missing labels using a positive and unlabeled learning model and label correlations using stacking models.

Embodiments of the present disclosure may be used, for example and without limitation, for automatically tagging, or labeling, content items. By way of a non-limiting example, photographs uploaded to a social media site, such as and without limitation Flickr®, may be automatically tagged using embodiments of the present disclosure. By way of a further non-limiting example, documents may be classified based on labels assigned in accordance with embodiments of the present disclosure.

Figure 2:
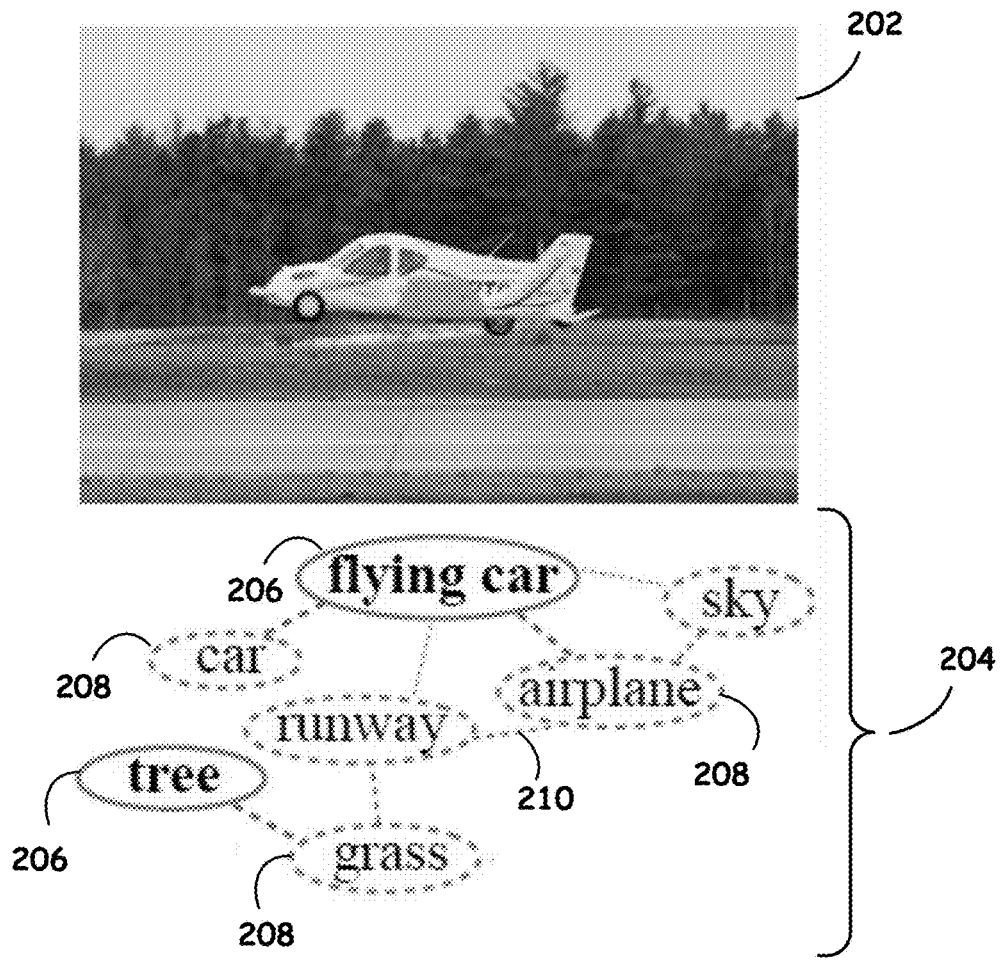

FIG. 1 provides an example of a process flow for use in accordance with one or more embodiments of the present disclosure. At step 102, an initial level of a stacked model structure is trained and may be used to estimate the probability that a label, which belongs to a set of labels, is applicable to a given instance, where the given instance may correspond to a content item. The probability is an estimate of the likelihood that a label, which may be currently excluded from a set of labels currently associated with the instance, or content item, is applicable, or inapplicable, to the content. By way of a non-limiting example and with reference to FIG. 2, an instance 202, which in the example is an image content item, is annotated, labeled or tagged, with labels 206 of label set 204, which includes labels 208 that are currently not being used as labels for instance 202. In other words, labels 208 are missing from the annotations currently being used to label image 202. In the example of FIG. 2, dotted lines, such as line 210, represent a correlation between at least two labels in the label set 204. In accordance with one or more embodiments, correlations between labels may be used to infer whether or not one or more of missing labels 208 are applicable to instance 202.

Referring again to step 102 of FIG. 1, an initial level of the stacked model may be generated using a training data set comprising a plurality of training instances, which may include one or more training instances, such as instance 202 of FIG. 2, missing one or more labels from the set of labels 204.

Figure 3:
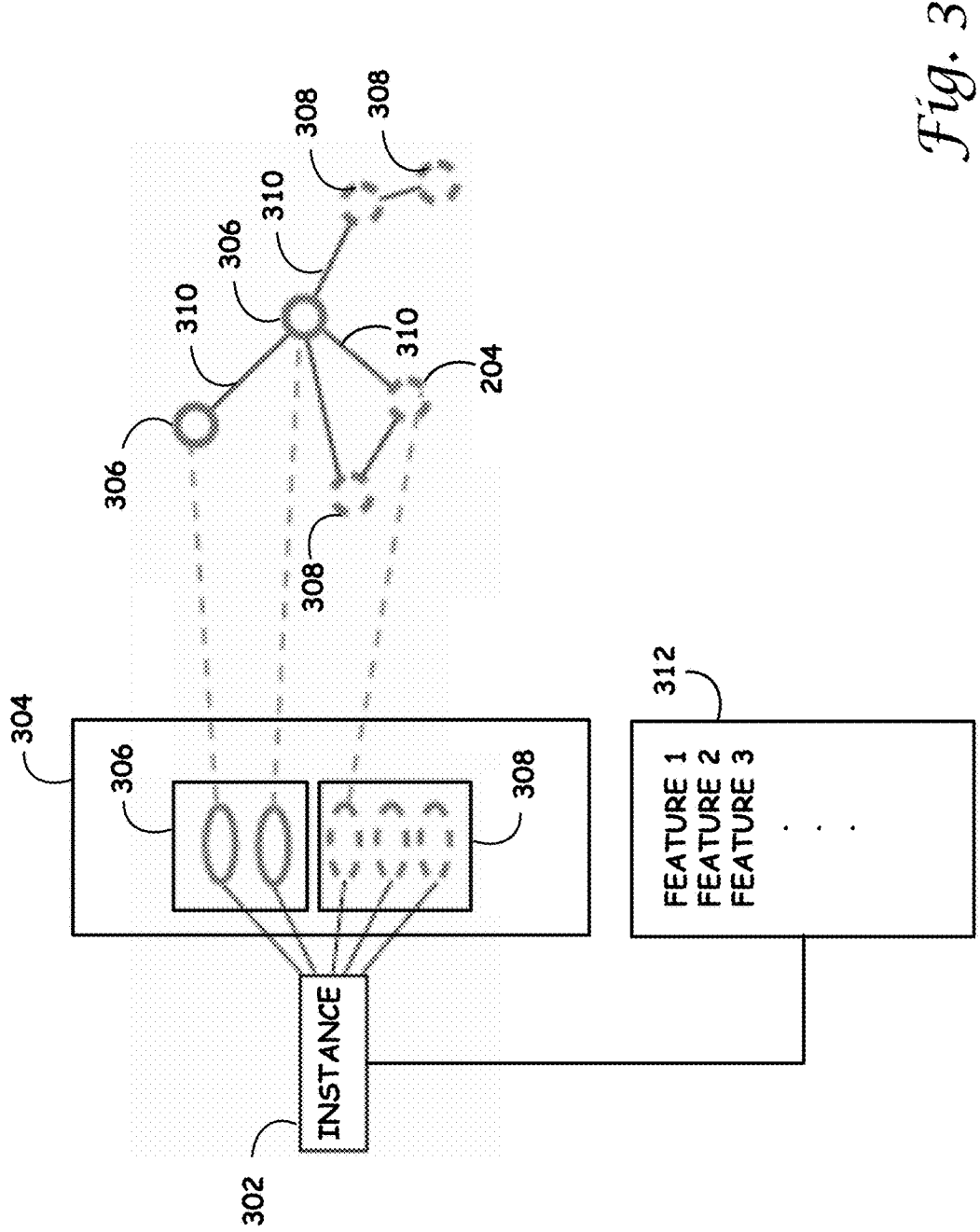

FIG. 3 provides an example of a training instance for use in accordance with one or more embodiments of the present disclosure. While embodiments of the present disclosure are described in connection with an image as a content item, it should be apparent that any data item or content item may be used in accordance with one or more embodiments. In the example shown in FIG. 3, training instance 302, which may be any type of data item or content item, may comprise a set of labels 304 and a set of features 312.

As discussed in connection with the example shown in FIG. 2, a particular instance may be missing one or more labels. With reference to the example shown in FIG. 3, instance 302 is annotated with labels 306, and is missing labels 308, from label set 304. A label in label set 304 may be related, or correlated, with one or more label(s) in label set 304. By way of a non-limiting example, lines 310 illustrate some of the correlations, or relationships, among labels in label set 304. Label set 204 is a non-limiting example of a label set that includes labels identified for content items including image 202. In the example shown in FIG. 2, label set 204 includes labels representing objects depicted in the image. By way of a non-limiting example, instance 302 might be a document and labels in label set 304 might include words contained in the document. Training instance 302 may further comprise a feature set 312 comprising one or more feature(s). By way of a non-limiting example, an image content item may comprise such features as color, texture etc.

Labels 306 annotating instance 302 might be provided by one or more individuals, or via some other source. While instance 302 is missing labels 308 of label set 304, the reason for the missing labels 308 is unclear. It may be that a label 308 may be missing because it is not applicable to instance 302; alternatively, the missing labels 308 may be missing because the labeling source(s) inadvertently neglected to identify the label 308 as being applicable to the instance 302, and not because the missing label 308 is inapplicable to instance 302. Instance 302 may be one of a number of instances annotated by one or more individual(s) that might miss labeling the instance with one or more labels that are applicable to the instance. In the example of FIG. 3, each label 308 of label set 304 might be applicable to instance 302. The potential for missing labels is especially heightened when the number of instances is very large and/or the cost of labeling is very high. A large training data set and/or high labeling costs may make it almost impossible to have a fully labeled training set. Embodiments of the present disclosure may be used to facilitate identification of missing label(s) 308 that are applicable to instance 302. In accordance with one or more such embodiments, the missing label(s) 308 applicable to instance 302 may be identified by learning from partially-labeled training instances and using label correlations to facilitate the learning.

Referring again to FIG. 1, an initial level of a stacked model generated at step 102 may be used to make a prediction regarding an instance's ground-truth label set. By way of a non-limiting example, the initial level of the stacked model may be used to determine a probability, for each one of the missing labels 308, that it is applicable to the instance 302. By way of a further non-limiting example, the initial level of the stacked model generated at step 102 may be used to determine a probability, or likelihood, that a label 308 is missing but applicable as opposed to not used because it is inapplicable.

At step 106 of FIG. 1, another level of the stack may be generated using output provided by a previous level's predictions, which output may comprise the previous level's ground-truth label set prediction. By way of a non-limiting example and in a case that the previous level is the initial level of the stack, the label set predictions which may be used to generate the current level of the stack may be the predictions generated at step 104. At step 108, the current level in the stack, which comprises one or more models generated at step 106, is used to make ground-truth label set predictions. As is illustrated in the example shown in FIG. 1, steps 106 and 108 may be optionally repeated to accommodate any number of levels in addition to the initial level.

In accordance with one or more embodiments, the initial and at least one additional levels of the stacked model may be used to make a labeling prediction for a content item, the labeling prediction may identify for each label of the plurality whether the label is applicable to the content item. In accordance with one or more such embodiments, the labeling prediction may comprise information identifying a ground-truth label set for the content item.

Figure 4:
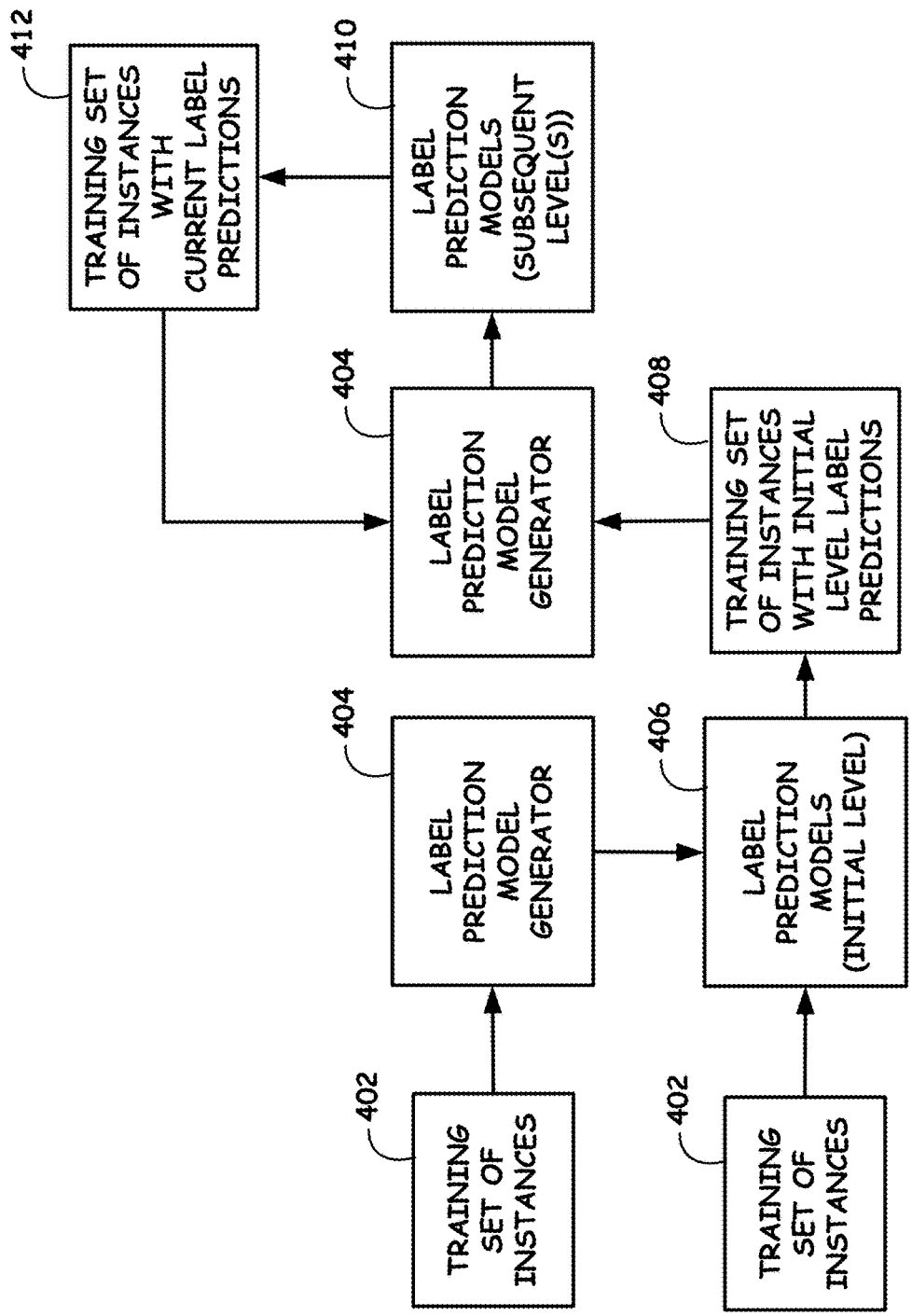

FIG. 4 provides a stacked model generation example in accordance with one or more embodiments of the present disclosure. A set 402 of training instances, which may comprise a number of instances such as instance 302 or instance 202, is input to a label prediction model generator, which may be used to generate an initial level 406 of a stacked model. The initial level 406 may comprise a model for each label of a label set, e.g., label set 304. Each training instance of set 402 may comprise a feature set, such as and without limitation feature set 312 for instance 302. Label prediction model generator 404 may use the training set 402 to generate a label prediction model(s) for an initial level 406 of a stacked model.

In accordance with one or more embodiments, label prediction model 406 comprises model parameters including a set of weights, each weight in the set corresponding to a label in the label set, e.g., label set 304. The weighting may reflect a bias toward positive samples, e.g., instances annotated with the label, relative to negative samples, e.g., instances not annotated with the label, for determining a probability associated with a given label.

Label prediction models belonging to the initial level 406 may be used to generate, for each instance in a training set, such as and without limitation training set 402, a set of predictions about the instance's ground-truth label set, which set of predictions may comprise a prediction for each label in the set of labels, such as label set 304. The set of predictions associated with a given instance, such as instance 302, comprises a probability, for each label in the label set, that the label is applicable to the instance.

By way of a non-limiting example, each label in label set 304 may be assigned a probability using a corresponding label prediction model belonging to the initial level 406 indicating a likelihood that the label 306 is applicable to the instance 302. By way of a non-limiting example, a probability may have the value ranging from 0 indicating no applicability to 1 indicating a high applicability. By way of a further non-limiting example, each label 306 that currently annotates instance 302 might be assigned a value of 1 indicating that it has the highest likelihood of being applicable to the instance 302, and each label 308 in label set 304 might be assigned a value in the range of 0 to 1 indicating the probability that the label 308 is applicable, or inapplicable, to the instance 302.

In the example shown in FIG. 4, label prediction models in the initial level 406 use training data set 402, which may comprise, for each instance 302, the labels 306 that annotate the instance 302 and the features of feature set 312 for the instance, to generate output comprising a ground-truth label set prediction for each instance 302 in the training data set 402. For each instance of training set 402, the output of the initial level 406 may comprise, a feature set 312, a label set 304, and a ground-truth label set prediction. In accordance with one or more embodiments, a training instance's ground-truth label set prediction may be included with the training instance's feature set 312. Training data set 408 may be input to label prediction model generator 404, which may generate each subsequent level of the stacked model using a previous level's output.

In accordance with one or more embodiments, the initial and subsequent levels of the stacked model may comprise a model for each label in a label set, e.g., label set 304. With reference to label set 304 of FIG. 3, each level of the stacked model may comprise a model for each label 306 and each label 308 of label set 304.

In accordance with one or more embodiments, the stacked model may have any number of levels in addition to the initial level, and label prediction model generator 404 may be used to generate each level of the stacked model. In the example of FIG. 4, a current level of the stacked model that follows the initial level may be generated by the label prediction model generator 404 using the ground-truth label predictions generated by the previous level of the stacked model, e.g., the initial level's 406 ground-truth label predictions may be used to generate a next level, which generates a current set of ground-truth label set predictions 412, which may be in turn used by the label prediction model generator 404 to generate another level of the stacked model.

By way of a non-limiting example, label prediction model generator 404 may use training data set 402 which comprises both positive and negative samples to generate a level of the stacked model. By way of a further non-limiting example, for a given label, a positive sample may be a training instance that includes the label as an annotation for the training instance's content item, and conversely a negative sample may be a training instance that does not include the label as an annotation for the training instance's content item. In accordance with at least one embodiment, training data set 402 may comprise a label set 304 comprising both positive and negative samples for a given training instance. Each instance of the training data set 402 may have a feature set 312 comprising one or more features of the training instance's content item.

In accordance with one or more embodiments, label prediction model generator 404 may generate a set of parameters including a weight for each label in the label set 304. The set of model parameters may be tested, using test data comprising a set of instances, and the label prediction model generator 404 may regenerate the set of model parameters if a level of accuracy is not achieved. In regenerating the label prediction model 406, the model parameters may be modified, e.g., the weights assigned to one or more of the negative samples in the label set 304 may be modified, and the model parameters may be retested using the test data set to arrive at an acceptable level of accuracy. By way of a non-limiting example, the test data set may comprise one or more instances that are known to be positive samples for one or more labels, and the label prediction model 406 may be tested to determine whether or not the set of model parameters identifies such instances as having a high probability that the label(s) is/are applicable to the one or more instances.

Figure 5:
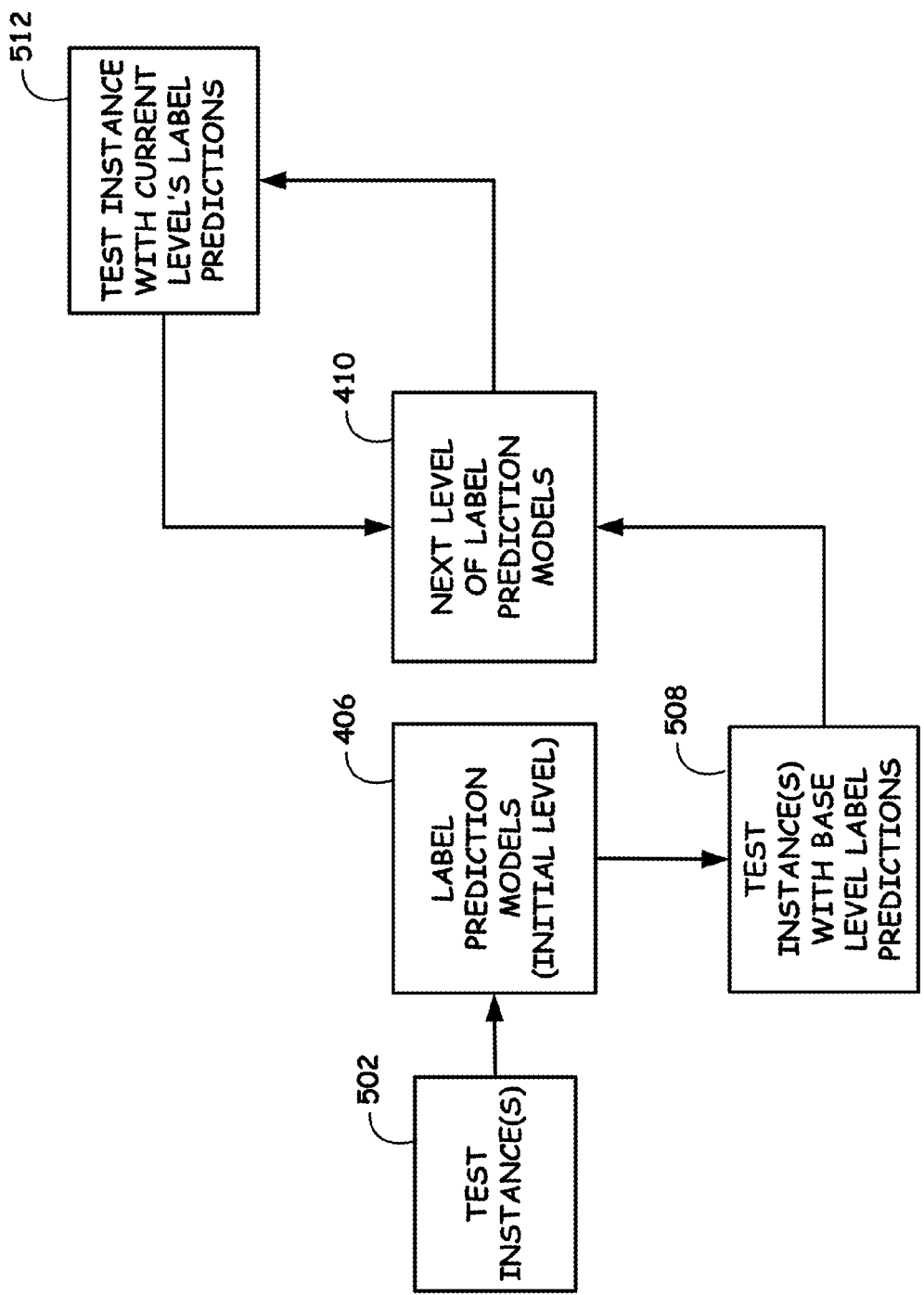

FIG. 5 illustrates a stacked model inference example using test instance(s) in accordance with one or more embodiments of the present disclosure. In the example shown in FIG. 5, an iterative approach may be used in generating a ground-truth label set prediction for each test instance 502. A test instance 502 may comprise a label set 304, which may comprise labels 306 and 308, and a feature set 312, which may comprise any number of features, may be input to the initial level 406 of the stacked model. The initial level 406 may generate a ground-truth label set prediction for the test instance 502 using the instance's feature set 312. The initial level 406 may generate output in connection with the test instance 502, which output may comprise the label set 304, feature set 312 and ground-truth label set predictions, which becomes input to the next level 410 of the stacked model. The next level 410 of the stacked model, which becomes the current level, may use the input to generate its ground-truth label set predictions. The process may be iteratively repeated until a final level of the stacked model outputs the ground-truth label set for the test instance 502.

By virtue of using a stacked model approach, output from a level of the stacked model may be used by another level of the stacked model. By way of a non-limiting example, a stacked model level 502, or 512, may determine that a missing label 308 is applicable to the instance 502. By way of a non-limiting example, a label identified as being applicable to an instance at one level of the model may be used together with label correlations in the label set 304 in determining whether another label, e.g., a label 308, is applicable to the instance 502.

FIG. 6 provides some notational examples used herein in connection with one or more embodiments of the present disclosure. A feature vector may be used to express a feature set 312 of an instance 302. A feature vector for an instance i may be represented herein as $x_i$, and feature vectors for a set of n training instances may be represented as $x_1, \ldots, x_n$.

A label set, such as and without limitation label set 304, which may be referred to as a dictionary of labels, may comprise a number, e.g., q, of possible labels. Each instance i may have a set of ground-truth labels represented as $y_i=\{y_i^1, \ldots, y_i^q\}$, where $y_i^k=1$ may indicate that the k-th label in the label set, e.g., label set 304 of instance i, is applicable, in which case $y_i^k=0$ may be used to indicate that the k-th label is inapplicable.

An instance i may have an associated set of features, $x_i$, and a ground-truth label set, $y_i$. Embodiments of the present disclosure may be used to determine an instance's ground-truth label set, which is beneficial since an instance in a training data set of instances is likely not to be annotated by its ground-truth label set, e.g. the instance's label set is missing one or more labels that is/are appropriate for, or applicable to, the instance. For example and without limitation, the instance may not be fully annotated or labeled by a labeler, in which case an instance i may be represented by its set of features, $x_i$, and its set of annotations, $s_i$, where $s_i=(s_i^1, \ldots, s_i^q)^T \in \{0,1\}^q$, where $s_i^k \leq y_i^k (\forall 1 \leq i \leq n, \forall 1 \leq k \leq q)$. In other words, $s_i$ may be used to denote a label set that may not be the same as the instance's ground-truth label set, e.g., the label set, $s_i$, may be missing one or more labels that is/are considered to be applicable in its ground-truth label set, $y_i$. For each k-th label in a label set, when $s_i^k=1$, $y_i^k=1$, and the probability that a label $s_i^k$ appears in the $s_i$ is zero if the label is absent from the ground-truth label set, which may be expressed as follows:

$$\Pr(s_i^k=1 | x_i, y_i^k=0)=0, \forall i,k$$

When a label, $s_i^k$, is missing from the set of annotated labels, $s_i$, it is not clear whether the missing label is missing because it is not applicable to the instance, in which case $y_i^k=0$ indicating that the label is absent from the instance's ground-truth label set, or the missing label is missing because a labeler neglected to annotate the instance using the label, in which case $y_i^k=1$ indicating that the label is present in the instance's ground-truth label set. Embodiments of the present disclosure provide a mechanism for determining, for each missing label of a set of multiple labels, which alternative is correct using a stacked model approach, which has an initial level, such as initial level 406, and a number, L, of subsequent levels such as level(s) 410. Levels 406 and 410 may be trained by model generator 404 using a positive and unlabeled stochastic gradient descent learner. The stacked model may use label correlations to determine an instance's ground-truth label set. In accordance with one or more embodiments, model learning, which may be performed by model generator 404, is used to generate the models to make predictions that accurately predict the ground-truth for each label of multiple labels.

Referring again to FIG. 6, a set of annotated labels for a set of n training instances, such as training instance set 402, may be represented as $s_1, \ldots, s_n$, where an annotated label set for an instance i may be represented as $s_i=(s_i^1, \ldots, s_i^q)^T$. A set of ground-truth label sets for the n training instances may be represented as $y_1, \ldots, y_n$, where a ground-truth label set for an instance i may be represented as $y_i=(y_i^1, \ldots, y_i^q)^T$. A training data set, such as training set 402, may be represented as $\mathcal{D}=\{(x_i, s_i)\}_{i=1}^n$, which may be a multi-label training set with missing labels.

Figure 7:
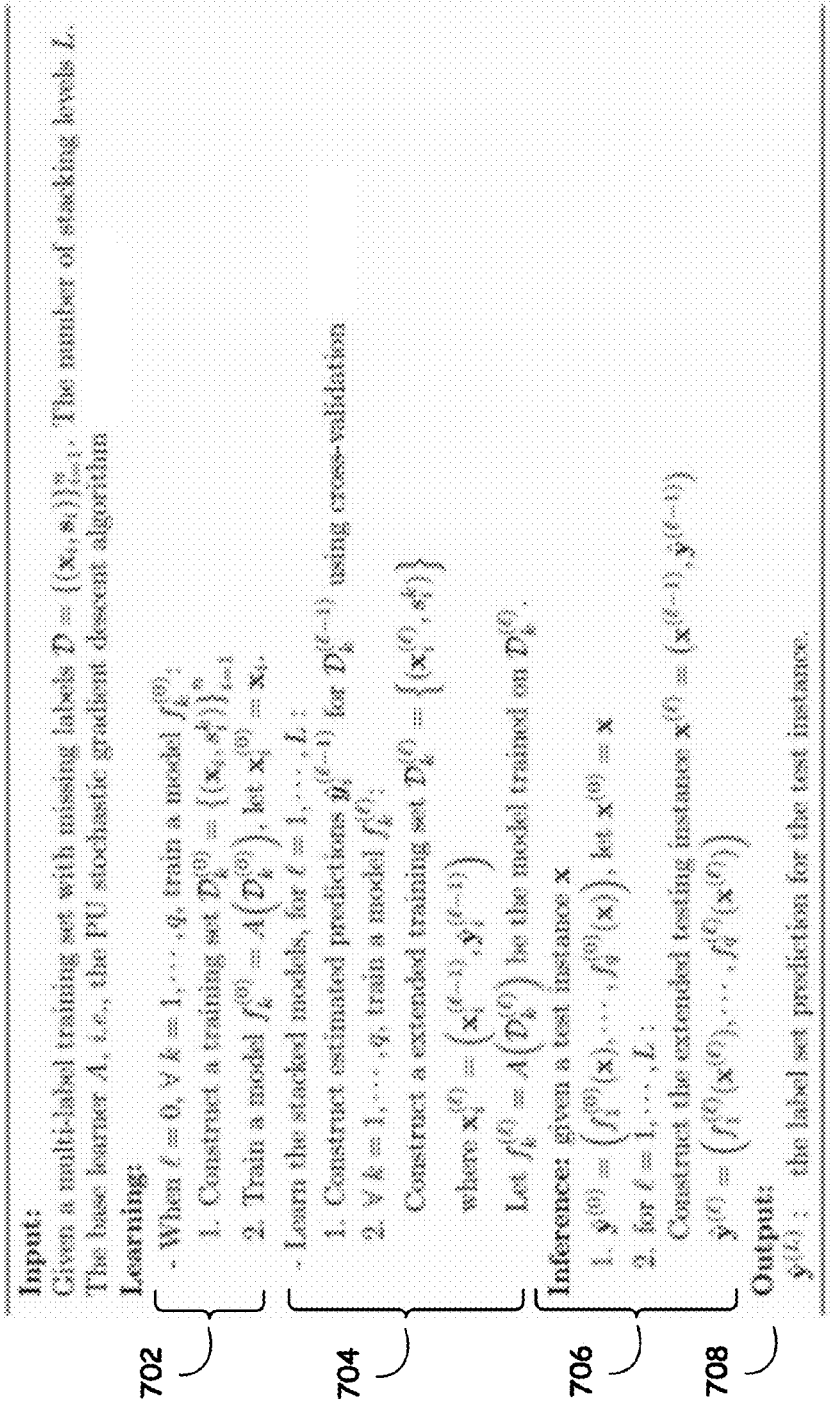

FIG. 7 provides an example of model generation pseudocode in accordance with one or more embodiments of the present disclosure. Portions 702 and 704 of pseudocode 700 may be used to generate a stacked model comprising an initial level and one or more subsequent levels. The initial level of the stacked model may be the label prediction model level 406 and each subsequent level may be a label prediction model level 410, and levels 406 and 410 may be generated using a model learner, such as label prediction model generator 404, using the positive and unlabeled stochastic gradient descent learning method and a multi label training set with missing labels.

Portion 702 of the code 700 may be used to generate the initial level of the stacked model. The initial level of the stacked model may be generated using the feature set, $x_i$, which may correspond to instance 302, of the training set $\mathcal{D}$, which may correspond to training set 402. The initial level may comprise a model, $f_k^{(0)}$, for each k-th label of the label set, e.g., label set 304. For each instance in the training set, each label, e.g., each k-th label, of the label set may have a model that is generated using a model learner, A, and a training data set $\mathcal{D}_k^{(0)}=\{(x_i, s_i^k)\}_{i=1}^n$. For each k-th label, the initial level's training data set, $\mathcal{D}_k^{(0)}$, may therefore comprise the feature set of each instance, i, and a value, e.g., 0 or 1, indicating whether the label is present, or absent, in the instance's label set, e.g., whether or not the label is being used to annotate the instance.

Referring to portion 704 of the code 700, the initial level of the stacked model may be used to infer labels, e.g., the ground-truth label set, for each instance. By way of a non-limiting example, a set of predictions is generated by the initial level of the stacked model, the prediction set comprising, for each instance i, a ground-truth label set prediction, $\hat{y}_i^{(0)}$, which includes a prediction for each k-th label generated using the k-th label's model, $f_k^{(0)}$, and the k-th label's training data set, $\mathcal{D}_k^{(0)}$. As is discussed in more detail below in connection with FIGS. 8 and 9, cross validation may be used in inferring labels at the initial level, and subsequent levels, of the stacked model.

The label inferences generated by the initial level of the stacked model may be used, together with the feature set 312 and label set 304 of each instance, to train the next level of the stacked model. More generally speaking, the label inferences generated by a previous level, l−1, may be used in a current level, l, to train the current level of the stacked model. At a current level, l, a model, $f_k^{(l)}$, may be generated for each k-th label, using a model generator, A, and a training data set, $\mathcal{D}_k^{(l)}=\{(x_i^l, s_i^k)\}$ for each instance i, where $x_i^{(l)}=(x_i^{(l-1)}, \hat{y}_i^{(l-1)})$, such that the feature set, $x_i^{(l)}$, for an instance, i, comprises the previous level's feature set, $x_i^{(l-1)}$, and the previous level's label inferences, $\hat{y}_i^{(l-1)}$. A model trained on $\mathcal{D}_k^{(l)}$ may be expressed as $f_k^{(l)}=A(\mathcal{D}_k^{(l)})$, for each label, k, of a number, q, labels of a label set.

Portion 704 may be repeated for each level, l, of L levels of a stacked model. The number of levels may be a predetermined number, and/or may be a number that is empirically determined based on a determined convergence, which may be determined based on whether or not there are any improvements in the estimates from one level, or iteration, to the next level.

Portion 706 makes inferences about each test instance, x, using the stacked model learned using portions 702 and 704. For each instance, x, the levels, e.g., l=0 to L, of the stacked model may be used to make inferences about the instance. The output from a previous level, l−1, may be used as input to a current level, l, in the stacking, and the last level, l=L, of the stacked model may be used to generate a final set of predictions, a prediction of the ground-truth label set for the test instance, x.

In accordance with one or more embodiments, the stacked model that may be used to predict the ground-truth label set for an instance is learned using inferred labels, e.g., learning using a label set that may or may not be the ground-truth label set. Advantageously, embodiments of the present disclosure may train the stacked model on inferred labels, so that the trained model may be used to make exact inferences regarding an instance's true labels using known features of the instance. This may be contrasted with an approach that requires ground-truth label sets in learning and makes approximate inferences regarding true labels, which true labels are not known at inference time.

With reference to portion 706, a set of predictions, $\hat{y}^{(0)} = (f_1^{(0)}(x), \ldots, f_q^{(0)}(x))$, where $x^{(0)} = x$, may be generated for the initial level of the stacked model using the test instance's feature set, e.g., feature set 312, and each label's model generated for the initial model, e.g., the k-th label's base level model may be represented as $f_k^{(0)}$. The set of predictions, $\hat{y}^{(0)}$, from the initial level of the stacked model may be used as input to the next level, e.g. l=1, to generate a set of predictions, $\hat{y}^{(1)} = (f_1^{(1)}(x^{(1)}), \ldots, f_q^{(1)}(x^{(1)}))$, using an extended testing instance, $x^{(1)} = (x^{(0)}, \hat{y}^{(0)})$, comprising the initial level's set of predictions and feature set for the instance. More generally speaking, at each level of the stacked model following the initial level of the model, a set of predictions, $\hat{y}^{(l)} = (f_1^{(l)}(x^{(l)}), \ldots, f_q^{(l)}(x^{(l)}))$, May be generated using an extended testing instance, $x^{(l)} = (x^{(l-1)}, \hat{y}^{(l-1)})$, comprising the previous level's set of predictions and feature set for the instance.

In accordance with one or more embodiments, the base learner, A, may be a positive and unlabeled gradient descent model learner. In accordance with one or more embodiments, a positive and unlabeled stochastic gradient descent approach, which can handle large-scale data sets with missing label assignments, is used to learn a set of parameters, $\{w_k\}_{k=1}^q$ where $x_i \in \mathbb{R}^D$, comprising a weight for each k-th label in a set of q labels, e.g., such as and without limitation label set 304. In accordance with one or more such embodiments, the weights are optimized to maximize the likelihood of $y_i^k$; in other words to maximize the likelihood of determining the ground-truth labels for any content item, or instance, i. An optimized parameter, $w_k^*$, for the k-th label may be expressed as:

$$w_k^* = \underset{w_k}{\mathrm{argmax}} \log\left(\prod_{i=1}^n Pr(y_i^k = 1 \mid x_i, w_k)\right)$$

In accordance with one or more embodiments, the positive and unlabeled stochastic gradient descent learning method extends logistic regression to classification with incomplete label assignments, and may use assumptions that $y_i^k$ satisfies a Bernoulli distribution, and $$Pr(y_i^k = 1 \mid x_i, w_k) = \frac{1}{1 + \exp(-w_k \top x_i)}$$

An assumption may be made that annotated label are randomly sampled from the ground-truth label set with a constant rate, c, where the sampling process may be independent of other factors, such as a feature of the instance. In a case that it is assumed that the probability that a label is not missing by the labeler is an unknown constant, such a constant, c, may be expressed as:

$$c = PR(s_i^k = 1 \mid y_i^k = 1) = PR(s_i^k = 1 \mid y_i^k = 1, x_i, w_k),$$

where c may be directly estimated from the training set using cross validation. Using Bayes' theorem:

$$Pr(y_i^k = 1 \mid x_i, w_k) = \frac{PR(s_i^k = 1 \mid x_i, w_k)}{PR(s_i^k = 1 \mid y_i^k = 1, x_i, w_k)}.$$

The probability of a missing label is applicable to an instance, i, may be expressed as:

$$PR(s_i^k = 1 \mid x_i, w_k) = \frac{c}{1 + \exp(-w_k \top x_i)},$$

and an optimized parameter, $w_k^*$, for the k-th label may be represented as:

$$w_k^* = \underset{w_k}{\mathrm{argmax}} \sum_{i=1}^n \log\left(\frac{1}{1 + \exp(-w_k \top x_i)} + \frac{(1 - s_i^k) + (1 - c)}{2}\right)$$

Embodiments of the present disclosure are able to scale to large-scale problems using stochastic gradient descent to solve the logistic regression efficiently. In accordance with one or more such embodiments, rather than assuming that all of the labels are available, e.g., an assumption that would conclude that a missing label is not appropriate or applicable to an instance, incomplete label assignments are examined to make a determination whether a missing label is applicable to an instance. In accordance with one or more such embodiments, a loss function may be used to weight negative samples, which loss function may be represented as follows:

$$l(w_k, \mathcal{D}) = -\sum_{i=1}^n \log \frac{1}{1 + \exp(-w_k \top x_i)} + \frac{(1 - s_i^k) + (1 - c)}{2}$$

Figure 9:
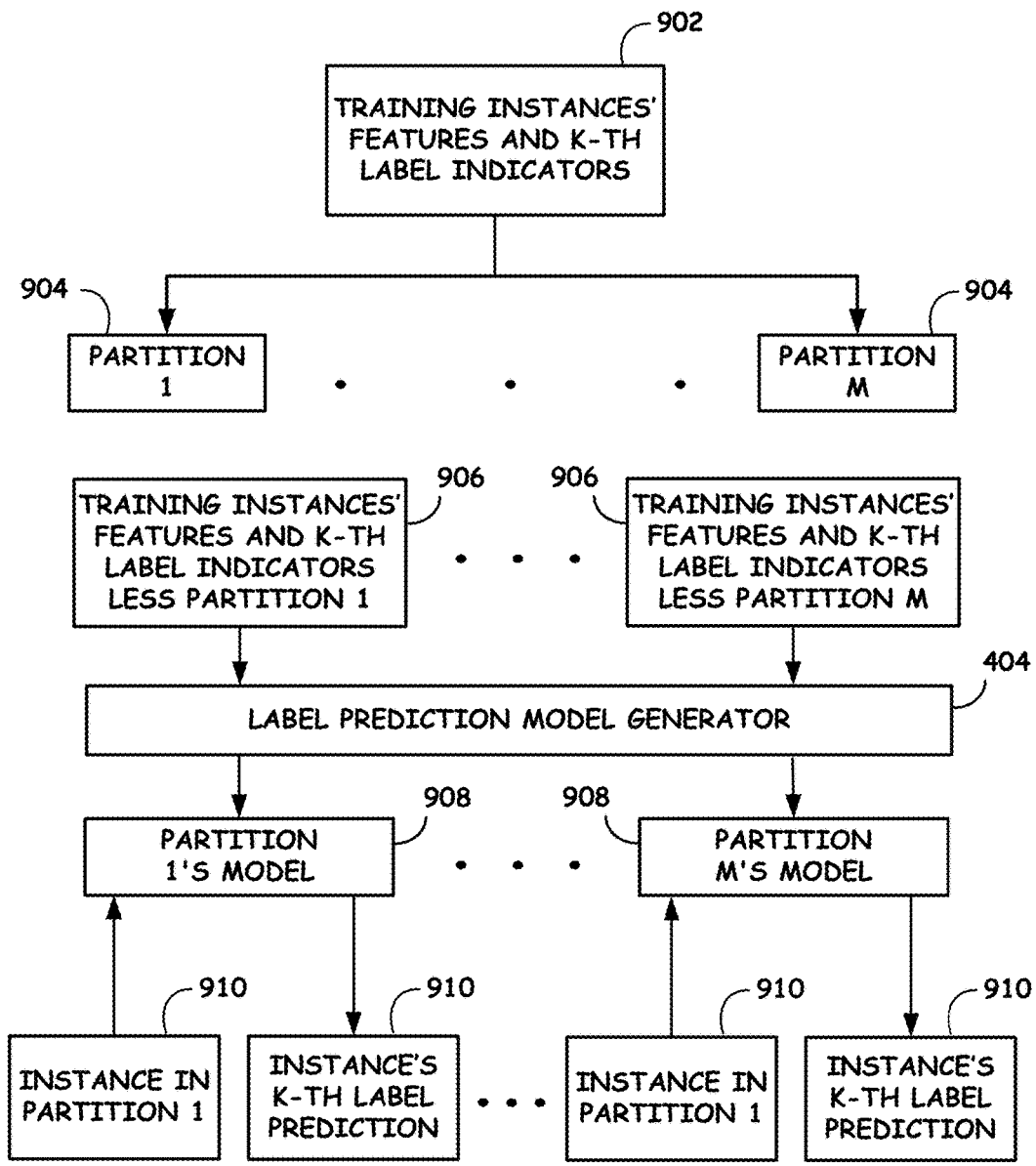

Referring again to portion 704 of FIG. 7, a cross validation technique may be used in accordance with one or more embodiments of the present disclosure. In accordance with one or more such embodiments, some training instances may be excluded from use in training a model, which model may be used to generate a label prediction for the excluded training instances. FIG. 8 provides a cross-validation pseudocode example for use in accordance with one or more embodiments of the present disclosure. FIG. 9 provides an illustrative overview corresponding to the cross-validation example shown in FIG. 8.

In the example shown in FIG. 8, a cross-validation prediction, $\hat{y}_i$, may be generated for each instance, $x_i$, using a training set, $\mathcal{D} = \{(x_i, s_i)\}_{i=1}^n$, and a base learner, A. For each label, k, in a set of q labels, a training data set may be determined using $\mathcal{D}$, which may be converted into $\{\mathcal{D}_1, \ldots, \mathcal{D}_q\}$, where $\mathcal{D}_k = \{(x_i, s_i^k)\}_{i=1}^n$, for each label, k, in the label set. For each label, k, its corresponding training data set, $\mathcal{D}_k$, may be partitioned into a number, m, disjoint subsets having a similar size, an equal, approximately equal, etc. size, and the resulting partitions may be denoted as $\mathcal{D}_k^1, \ldots, \mathcal{D}_k^m$. For each k-th label, m models are trained, and label predictions are made for each instance, i, in a given partition using a model that is trained without using the partition's training instances. In other words, for a label, k, and a partition, j, a model $f_k^j$ is trained using a model learner, A, such that the k-th label's training data set excludes the training instances assigned to partition j of the k-th label's training data set, which may be denoted as $\mathcal{D}_k - \mathcal{D}_k^j$. The resulting model, $f_k^j$, may be used to generate a set of predictions, $\hat{y}_i^k(x_i) = f_k^j(x_i)$, for each i-th instance having a feature set, $x_i$, belonging to the j-th partition, or $x_i \in \mathcal{D}_k^j$.

With reference to FIG. 9, a k-th label's training data set 902, which is denoted as $\mathcal{D}_k = \{(x_i, s_i^k)\}_{i=1}^n$ in FIG. 8, is partitioned into a number, m, partitions 904, which partitioning is denoted as $\mathcal{D}_k^1, \ldots, \mathcal{D}_k^m$ in FIG. 8. Model generator 404 uses m training data sets to generate m models 908, such that for a given j-th one of the models 908, a j-th one of the m training data set partitions is excluded from the training data set used to generate the model 908, which is denoted as $f_k^j = A(\mathcal{D}_k - \mathcal{D}_k^j)$. The model 908, which is represented as $f_k^j$ in FIG. 8, is used to generate a k-th label prediction 910 for each instance 910 in the partition 904 excluded from being used in generating the model 908. For a given instance 910, model 908 may use the instance's feature set, $x_i$, which may or may not include label predictions, such that the inclusion of label predictions in an instance's feature set may depend on the current level of the stacked model.

Figure 10:
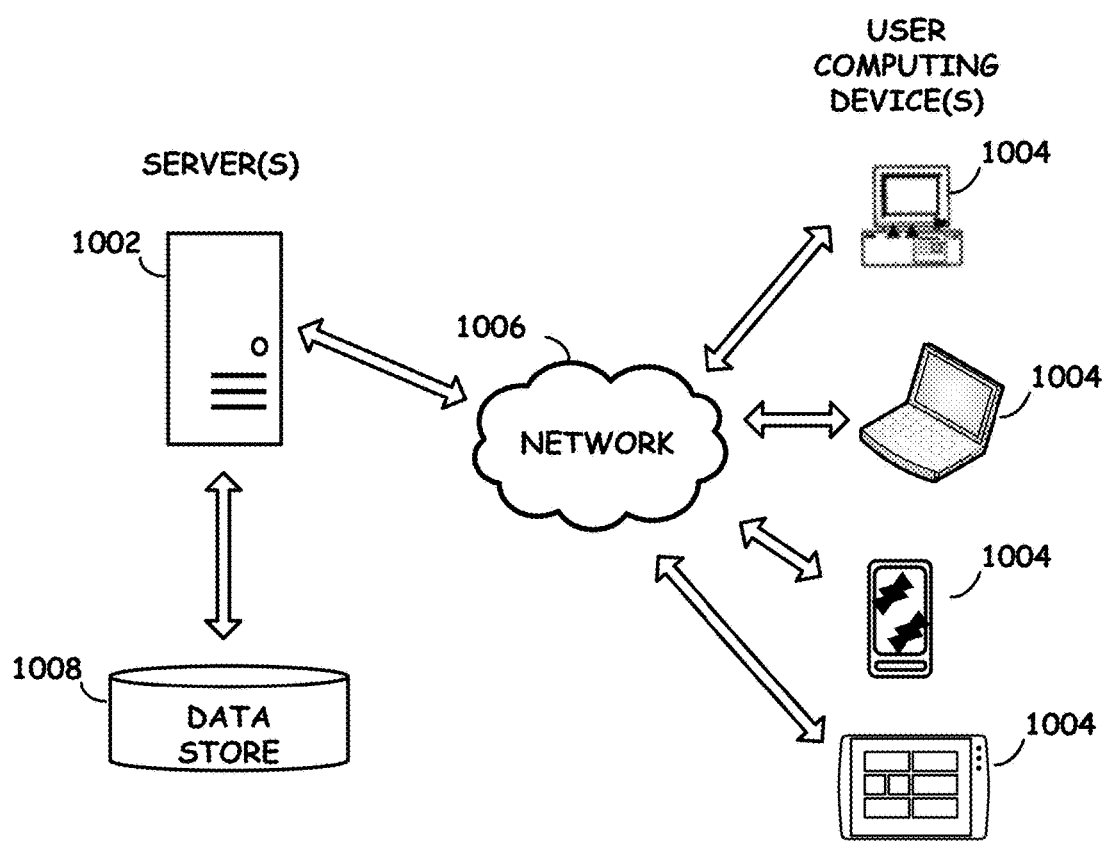
FIG. 10 illustrates some components that can be used in connection with one or more embodiments of the present disclosure.

FIG. 10 illustrates some components that can be used in connection with one or more embodiments of the present disclosure. In accordance with one or more embodiments of the present disclosure, one or more computing devices, e.g., one or more servers, user devices or other computing device, are configured to comprise functionality described herein. For example, one or more of the computing device 1002 may be configured to execute program code, instructions, etc. to provide functionality in accordance with one or more embodiments of the present disclosure.

Computing device 1002 may serve content to user computing devices 1004 using a browser application via a network 1006. Data store 1008 may be used to store program code to configure a server 1002 to functionality in accordance with one or more embodiments of the present disclosure. By way of a non-limiting examples, computing device 1002 may serve content to a user computing device 1004, which may include one or more labels of a ground-truth label set determined using embodiments of the present disclosure. The content served may comprise a content item and the one or more labels from the content item's determined ground-truth label set. As yet another non-limiting example, computing device 1002 may receive a request from a user computing device 1004 to retrieve a content item, and may identify one or more content items by searching one or more ground-truth label sets using a label query, which may be received as part of the request, for responding to the content item request.

The user computing device 1004 can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 1002 and the user computing device 1004 can include one or more processors, memory, a removable media reader, network interface, display and interface, and one or more input devices, e.g., keyboard, keypad, mouse, etc. and input device interface, for example. One skilled in the art will recognize that server 1002 and user computing device 1004 may be configured in many different ways and implemented using many different combinations of hardware, software, or firmware.

In accordance with one or more embodiments, a computing device 1002 can make a user interface available to a user computing device 1004 via the network 1006. The user interface made available to the user computing device 1004 can include content items, or identifiers (e.g., URLs) selected for the user interface in accordance with one or more embodiments of the present invention. In accordance with one or more embodiments, computing device 1002 makes a user interface available to a user computing device 1004 by communicating a definition of the user interface to the user computing device 1004 via the network 1006. The user interface definition can be specified using any of a number of languages, including without limitation a markup language such as Hypertext Markup Language, scripts, applets and the like. The user interface definition can be processed by an application executing on the user computing device 1004, such as a browser application, to output the user interface on a display coupled, e.g., a display directly or indirectly connected, to the user computing device 1004.

In an embodiment the network 1006 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 10. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 11:
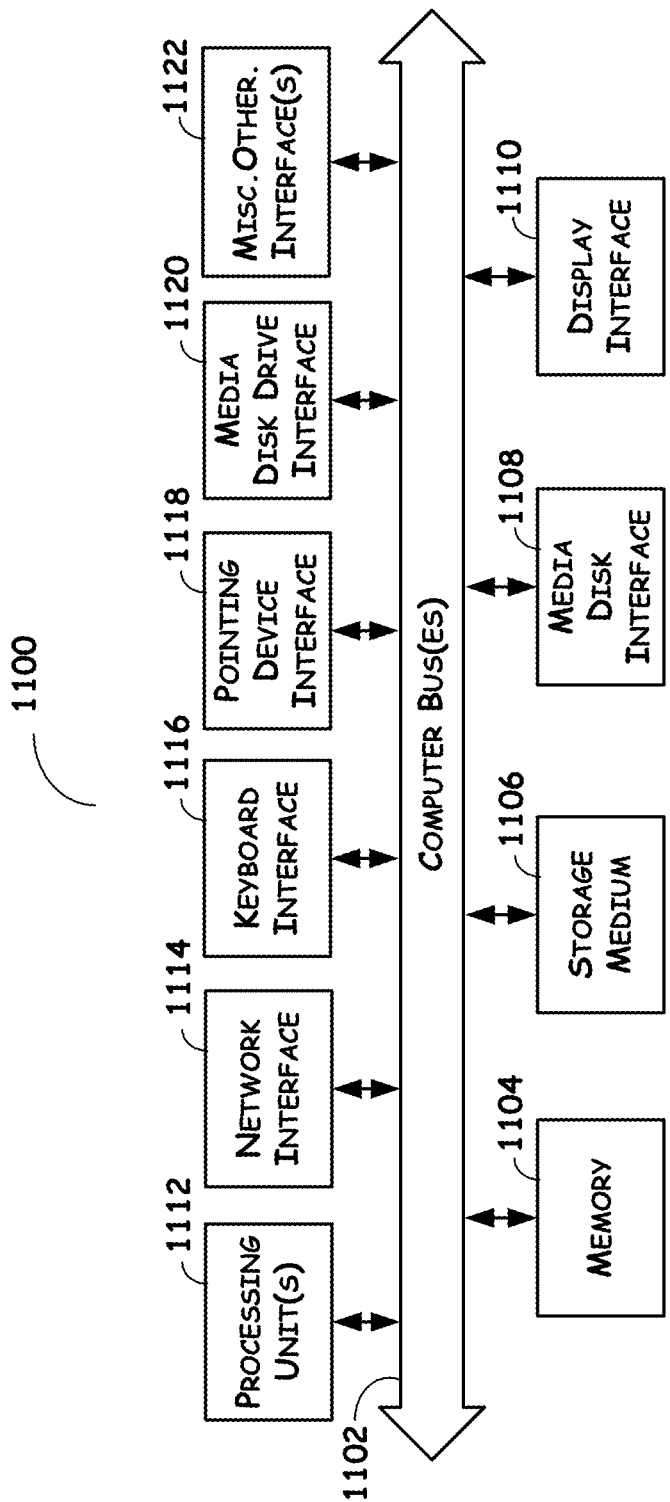
FIG. 11 is a detailed block diagram illustrating an internal architecture of a computing device in accordance with one or more embodiments of the present disclosure.

FIG. 11 is a detailed block diagram illustrating an internal architecture of a computing device, e.g., a computing device such as server 1002 or user computing device 1004, in accordance with one or more embodiments of the present disclosure. As shown in FIG. 11, internal architecture 1100 includes one or more processing units, processors, or processing cores, (also referred to herein as CPUs) 1112, which interface with at least one computer bus 1102. Also interfacing with computer bus 1102 are computer-readable medium, or media, 1106, network interface 1114, memory 1104, e.g., random access memory (RAM), run-time transient memory, read only memory (ROM), etc., media disk drive interface 1120 as an interface for a drive that can read and/or write to media including removable media such as floppy, CD-ROM, DVD, etc. media, display interface 1110 as interface for a monitor or other display device, keyboard interface 1116 as interface for a keyboard, pointing device interface 1118 as an interface for a mouse or other pointing device, and miscellaneous other interfaces not shown individually, such as parallel and serial port interfaces, a universal serial bus (USB) interface, and the like.

Memory 1104 interfaces with computer bus 1102 so as to provide information stored in memory 1104 to CPU 1112 during execution of software programs such as an operating system, application programs, device drivers, and software modules that comprise program code, and/or computer-executable process steps, incorporating functionality described herein, e.g., one or more of process flows described herein. CPU 1112 first loads computer-executable process steps from storage, e.g., memory 1104, computer-readable storage medium/media 1106, removable media drive, and/or other storage device. CPU 1112 can then execute the stored process steps in order to execute the loaded computer-executable process steps. Stored data, e.g., data stored by a storage device, can be accessed by CPU 1112 during the execution of computer-executable process steps.

Persistent storage, e.g., medium/media 1106, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:

training, using a multimedia data storage and retrieval system server, an initial level of a stacked model for use in making a labeling prediction, the initial level being trained using feature information for each training instance, corresponding to a content item, of a plurality of training instances corresponding to a plurality of content items, at least one training instance of the plurality is missing at least one label of a plurality of labels, the feature information corresponding to a plurality of features associated with the training instance of the plurality;

generating, using the multimedia data storage and retrieval system server, a labeling prediction for each training instance of the plurality using the initial level of the stacked model, the labeling prediction comprising a label applicability prediction for at least one label of the plurality of labels missing from the training instance's set of labels;

training, using the multimedia data storage and retrieval system server, one or more additional levels of the stacked model using one or more previous levels of the stacked model, the one or more previous levels comprising the initial level of the stacked model, each additional level being trained using information for each training instance of the plurality, each training instance's information comprising the labeling prediction, from a previous level of the stacked model, the feature information corresponding to the plurality to features, and information indicating the training instance's set of labels;

identifying, using the multimedia data storage and retrieval system server, a plurality of labeling predictions for the plurality of content items using the stacked model, a labeling prediction, for a content item of the plurality, identifying for each label of the plurality whether the label is applicable to the content item, and for each content item of the plurality that is missing at least one label, its labeling prediction comprising a prediction whether or not the at least one missing label is applicable;

receiving, via the multimedia data storage and retrieval system server and from a user computing device, a content retrieval request comprising a label query;

identifying, via the multimedia data storage and retrieval system server, a number of content items, from the plurality of content items, the identification of the number of content items comprising using the label query in searching the plurality of labeling predictions, including each labeling prediction identified for each content item missing at least one label, determined using the stacked model; and serving, via the multimedia data storage and retrieval system server and to a user computing device over an electronic communications network, the number of content items in response to the content retrieval request from a user computing device.

2. The method of claim 1, identification of the labeling prediction for the content item further comprising:

using the content item's feature information to identify the content item's labeling prediction for the initial level of the stacked model; and using information comprising the labeling prediction from the previous level of the stacked model, the content item's feature information, and information indicating the content item's set of labels to identify the content item's labeling prediction for each additional level of the stacked model.

3. The method of claim 1, the initial level and each additional level of the stacked model comprising a plurality of weights, each weight in the plurality corresponding to a label of the plurality of labels.

4. The method of claim 1, labeling prediction generation further comprising:

generating the labeling prediction for each training instance of the plurality using the initial level of the stacked model, the feature information corresponding to a plurality of features associated with the training instance and the training instance's set of labels.

5. The method of claim 1, further comprising:

generating, using the computing device, a labeling prediction for a training instance of the plurality using each additional level of the one or more additional levels of the stacked model.

6. The method of claim 5, labeling prediction generation for each training instance of the plurality using each additional level of the one or more additional levels of the stacked model further comprising:

generating the labeling prediction for a training instance of the plurality using each additional level of the stacked model and correlations between labels of the plurality.

7. The method of claim 5, labeling prediction generation for each training instance of the plurality using each additional level of the one or more additional levels of the stacked model further comprising:

generating the labeling prediction for a training instance of the plurality using each additional level of the stacked model, the previous level's labeling prediction for the instance, feature information corresponding to a plurality of features associated with the training instance and the training instance's set of labels.

8. The method of claim 1, labeling prediction generation for each training instance of the plurality using the initial level of the stacked model further comprising:
generating the labeling prediction for the training instance using cross validation, such that the training instance is excluded from generating a model that is used to generate the labeling prediction for the training instance.

9. The method of claim 1, one of the one or more additional levels of the stacked model is a final level of the stacked model, and the final level of the stacked model is used to generate the labeling prediction for a content item.

10. A multimedia data storage and retrieval system server comprising:
a processor;
a non-transitory storage medium for tangibly storing thereon program logic for execution by the processor, the stored logic comprising:
training logic executed by the processor for training an initial level of a stacked model for use in making a labeling prediction, the initial level being trained using feature information for each training instance, corresponding to a content item, of a plurality of training instances corresponding to a plurality of content items, at least one training instance of the plurality is missing at least one label of a plurality of labels, the feature information corresponding to a plurality of features associated with the training instance of the plurality;
generating logic executed by the processor for generating a labeling prediction for each training instance of the plurality using the initial level of the stacked model, the labeling prediction comprising a label applicability prediction for at least one label of the plurality of labels missing from the training instance's set of labels;
training logic executed by the processor for training one or more additional levels of the stacked model using one or more previous levels of the stacked model, the one or more previous levels comprising the initial level of the stacked model, each additional level being trained using information for each training instance of the plurality, each training instance's information comprising the labeling prediction from a previous level of the stacked model, the feature information corresponding to the plurality to features, and information indicating the training instance's set of labels;
identifying logic executed by the processor for identifying a plurality of labeling predictions for the plurality of content items using the stacked model, a labeling prediction, for a content item of the plurality, identifying for each label of the plurality whether the label is applicable to the content item;
receiving logic executed by the processor for receiving, from a user computing device, a content retrieval request comprising a label query;
identifying logic executed by the processor for identifying a number of content items, from the plurality of content items, the identification of the number of content items comprising using the label query in searching the plurality of labeling predictions, including each labeling prediction identified for each content item missing at least one label, determined using the stacked model; and
serving logic executed by the processor for serving, to a user computing device over an electronic communications network, the number of content items, in response to the content retrieval request from a user computing device.

11. The system server of claim 10, identification of the labeling prediction for the content item further comprising:
using logic executed by the processor for using the content item's feature information to identify the content item's labeling prediction for the initial level of the stacked model; and
using logic executed by the processor for using information comprising the labeling prediction from the previous level of the stacked model, the content item's feature information, and information indicating the content item's set of labels to identify the content item's labeling prediction for each additional level of the stacked model.

12. The system server of claim 10, the initial level and each additional level of the stacked model comprising a plurality of weights, each weight in the plurality corresponding to a label of the plurality of labels.

13. The system server of claim 10, labeling prediction generation further comprising:
generating logic executed by the processor for generating the labeling prediction for each training instance of the plurality using the initial level of the stacked model, the feature information corresponding to a plurality of features associated with the training instance and the training instance's set of labels.

14. The system server of claim 10, further comprising:
generating logic executed by the processor for generating a labeling prediction for a training instance of the plurality using each additional level of the one or more additional levels of the stacked model.

15. The system server of claim 14, labeling prediction generation for each training instance of the plurality using each additional level of the one or more additional levels of the stacked model further comprising:
generating logic executed by the processor for generating the labeling prediction for a training instance of the plurality using each additional level of the stacked model and correlations between labels of the plurality.

16. The system server of claim 14, labeling prediction generation for each training instance of the plurality using each additional level of the one or more additional levels of the stacked model further comprising:
generating logic executed by the processor for generating the labeling prediction for a training instance of the plurality using each additional level of the stacked model, the previous level's labeling prediction for the instance, feature information corresponding to a plurality of features associated with the training instance and the training instance's set of labels.

17. The system server of claim 10, labeling prediction generation for each training instance of the plurality using the initial level of the stacked model further comprising:
generating logic executed by the processor for generating the labeling prediction for the training instance using cross validation, such that the training instance is excluded from generating a model that is used to generate the labeling prediction for the training instance.

18. The system server of claim 10, one of the one or more additional levels of the stacked model is a final level of the stacked model, and the final level of the stacked model is used to generate the labeling prediction for a content item.

19. A computer readable non-transitory storage medium having tangibly stored thereon processor-executable instructions, that when executed by a multimedia data storage and retrieval system server perform a method comprising:

training an initial level of a stacked model for use in making a labeling prediction, the initial level being trained using feature information for each training instance, corresponding to a content item, of a plurality of training instances corresponding to a plurality of content items, at least one training instance of the plurality is missing at least one label of a plurality of labels, the feature information corresponding to a plurality of features associated with the training instance of the plurality;

generating a labeling prediction for each training instance of the plurality using the initial level of the stacked model, the labeling prediction comprising a label applicability prediction for at least one label of the plurality of labels missing from the training instance's set of labels;

training one or more additional levels of the stacked model using one or more previous levels of the stacked model, the one or more previous levels comprising the initial level of the stacked model, each additional level being trained using information for each training instance of the plurality, each training instance's information comprising the labeling prediction from a previous level of the stacked model, the feature information corresponding to the plurality to features, and information indicating the training instance's set of labels;

identifying a plurality of labeling predictions for the plurality of content items using the stacked model, a labeling prediction, for a content item of the plurality, identifying for each label of the plurality whether the label is applicable to the content item;

receiving, from a user computing device, a content retrieval request comprising a label query;

identifying a number of content items, from the plurality of content items, the identification of the number of content items comprising using the label query in searching the plurality of labeling predictions, including each labeling prediction identified for each content item missing at least one label, determined using the stacked model; and serving, to a user computing device over an electronic communications network, the number of content items, in response to the content retrieval request from a user computing device.

20. The computer readable non-transitory storage medium of claim 19, identification of the labeling prediction for the content item further comprising: using the content item's feature information to identify the content item's labeling prediction for the initial level of the stacked model; and using information comprising the labeling prediction from the previous level of the stacked model, the content item's feature information, and information indicating the content item's set of labels to identify the content item's labeling prediction for each additional level of the stacked model.

21. The computer readable non-transitory storage medium of claim 19, the initial level and each additional level of the stacked model comprising a plurality of weights, each weight in the plurality corresponding to a label of the plurality of labels.

22. The computer readable non-transitory storage medium of claim 19, labeling prediction generation further comprising: generating the labeling prediction for each training instance of the plurality using the initial level of the stacked model, the feature information corresponding to a plurality of features associated with the training instance and the training instance's set of labels.

23. The computer readable non-transitory storage medium of claim 19, further comprising: generating a labeling prediction for a training instance of the plurality using each additional level of the one or more additional levels of the stacked model.

24. The computer readable non-transitory storage medium of claim 23, generation of a labeling prediction for each training instance of the plurality using each additional level of the one or more additional levels of the stacked model further comprising: generating the labeling prediction for a training instance of the plurality using each additional level of the stacked model and correlations between labels of the plurality.

25. The computer readable non-transitory storage medium of claim 23, generation of a labeling prediction for each training instance of the plurality using each additional level of the one or more additional levels of the stacked model further comprising: generating the labeling prediction for a training instance of the plurality using each additional level of the stacked model, the previous level's labeling prediction for the instance, feature information corresponding to a plurality of features associated with the training instance and the training instance's set of labels.

26. The computer readable non-transitory storage medium of claim 19, generation of a labeling prediction for each training instance of the plurality using the initial level of the stacked model further comprising: generating the labeling prediction for the training instance using cross validation, such that the training instance is excluded from generating a model that is used to generate the labeling prediction for the training instance.

27. The computer readable non-transitory storage medium of claim 19, one of the one or more additional levels of the stacked model is a final level of the stacked model, and the final level of the stacked model is used to generate the labeling prediction for a content item.

* * * * *